(12) United States Patent
Ulrich et al.

(10) Patent No.: US 6,707,001 B1
(45) Date of Patent: Mar. 16, 2004

(54) METHOD AND APPARATUS OF VOLTAGE PROTECTION FOR A WELDING-TYPE DEVICE

(75) Inventors: James F. Ulrich, Hortonville, WI (US); Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/279,808

(22) Filed: Oct. 11, 2002

(51) Int. Cl.$^7$ ................................................. B23K 9/10
(52) U.S. Cl. ............................. 219/130.21; 219/121.54
(58) Field of Search ........................ 219/130.21, 130.01, 219/130.31, 130.32, 130.33, 137 PS, 121.54

(56) References Cited

U.S. PATENT DOCUMENTS 4,103,141 A * 7/1978 Wristen .................. 219/130.01
5,630,954 A * 5/1997 Toth ....................... 219/130.01

OTHER PUBLICATIONS

Miller Electric Manufacturing Co., Spectrum 375 CutMate and ICE–27C Torch Owner's Manual, Aug. 2002, Appleton, WI.

* cited by examiner

*Primary Examiner*—Clifford C. Shaw
(74) *Attorney, Agent, or Firm*—Ziolkowski Patent Solutions Group, LLC

(57) ABSTRACT

The present invention is directed to an overvoltage protection control that includes a combination of hardware and software that together detect and determine an average voltage of a power signal being supplied by a power source to a welding-type device. The determined average voltage is then compared to a "trip" voltage. If the average voltage is greater than or equal to the trip voltage then the welding-type device is disabled. The present invention may also be implemented as an undervoltage control wherein the detected average voltage is compared to a minimum acceptable average voltage. If the average voltage of the power signal being supplied to the welding-type device is less than the minimum acceptable average voltage, the welding-type device is prevented from being operated.

28 Claims, 4 Drawing Sheets

METHOD AND APPARATUS OF VOLTAGE PROTECTION FOR A WELDING-TYPE DEVICE

BACKGROUND OF THE INVENTION

The present invention relates generally to welding systems and, more particularly, to a method and apparatus of voltage protection for use with a welding-type apparatus. Hereinafter, the term "welding-type" shall include welding, cutting, and induction heating devices requiring high power outputs.

Circuit breakers are commonly used in high power environments to protect electrical devices from unexpectedly high voltages. Some circuit breakers take the form of an overvoltage protection control that protects the internal components of an electrical device if the voltage exceeds an acceptable maximum. Typically, the overvoltage threshold is less than the rated maximum of the internal components so as to provide an additional level of protection for the components. Further, notwithstanding the electrical components ability to withstand higher voltages, the maximum allowable or acceptable voltage may be such that any voltage experienced higher than the maximum acceptable voltage yields to unstable environments. The unstable environments may lead to uncontrollable output or excessive heat generation that ultimately affects the instantaneous as well as long term functionality of the device.

Welding-type devices such as plasma cutters used for air plasma cutting and gouging typically implement an overvoltage protection control to protect the internal components of the arc cutting device as well as limit risks associated with unexpectedly high voltages. Typically, arc cutting devices operate on generators or sources with high peak voltage and implement an overvoltage control that detects the peak voltage of a control power winding of the power supply to prevent damage to the internal components of the arc cutting device. However, overvoltage protection based on the peak voltage of a power signal often causes improper operation on generators due to the high peak voltages typically encountered on engine driven power sources. For example, if the maximum acceptable voltage or "trip" voltage is set at 140 volts RMS then the peak voltage for a sinusoidal power signal is typically 198 volts. If, however, the input power signal has a triangular shape, generally true for engine driven generators, the peak voltage must be set for 243 volts to allow operation of the arc cutting device on the 140 volt RMS line. As such, an overvoltage protection based on peak voltage makes it difficult to operate on differing power sources. That is, if the trip voltage is set for operation on a utility line power source, the arc cutting device will not operate properly on a generator. However, if the trip voltage is dependent upon the arc welding device being powered by an engine driven generator, the arc cutting apparatus may experience excessive voltages when operated on a utility line power source.

Therefore, it is desirable to design an overvoltage protection control that enables proper operation of a welding-type device on both a utility line power source as well as a generator with improved variance between the trip voltages associated with each power source.

BRIEF DESCRIPTION OF THE INVENTION

The present invention is directed to an overvoltage protection control overcoming the aforementioned drawbacks. The present invention includes the combination of hardware and software that together detect and determine an average voltage of a power signal being supplied by a power source to a welding-type device. The determined average voltage is then compared to a "trip" voltage. Average voltage can refer either to the arithmetic average of a voltage or the average of the absolute value of that voltage or other statistical quantity. If the average voltage is greater than or equal to the trip voltage then the welding-type device is disabled. The present invention may also be implemented as an undervoltage control wherein the detected average voltage is compared to a minimum acceptable average voltage. In this regard, if the average voltage of the power signal being supplied to the welding-type device is less than the minimum acceptable average voltage, operation of the welding-type device is prevented. As such, the present invention provides an overvoltage/undervoltage protection control.

Therefore, in accordance with one aspect of the present invention, a voltage protection control is configured to detect a voltage of a power signal being supplied to a welding device by a power source. The control is also configured to determine an average of the voltage and compare the average voltage to a trip voltage. The voltage protection control is further configured to output a disabling signal designed to disable the welding device if the average voltage at least equals the trip voltage.

In accordance with another aspect of the present invention, a welding-type apparatus operable on either an engine driven power source or a utility line power source is provided. The welding-type apparatus comprises an enclosure housing a plurality of electrical components including a circuit board. The welding-type apparatus further includes a power cable extending from one end of the enclosure and connectable to the power source. A torch as well as a workpiece holder are provided and each is connected via respective connecting cables to another end of the enclosure. The welding-type apparatus further includes a controller configured to determine an average voltage of a power signal supplied to the plurality of electrical components when the power cable is connected to the power source and prevent operation of the welding-type device if the average voltage is outside an acceptable average voltage range.

In accordance with a further aspect of the present invention, a method of manufacturing the welding-type device operable on either an engine driven power source or a utility line power source is provided. The method includes the steps of providing an enclosure supportable of a plurality of electrical components. The plurality of electrical components includes a circuit board having at least one processor mounted thereto. The method further includes the step of providing at least one electrical path from the power cable to the plurality of electrical components wherein the power cable and the at least one electrical path are configured to translate a power signal from a power source to the plurality of electrical components. The method also includes configuring a processor to determine an average voltage of the power signal and prevent operation of the welding device if the average voltage is outside an acceptable average voltage range.

In accordance with yet a further aspect of the present invention, a computer readable storage medium is provided and includes a computer program stored thereon that represents a set of instructions that when executed by a processor causes the processor to detect an average voltage of a power signal translating power to a welding-type apparatus from a power source. The set of instructions further causes the processor to compare the average voltage to an average voltage range and determine if the average voltage falls outside the average voltage range. If the average voltage falls outside the average voltage range, the set of instructions cause the processor to output a signal designed to disable the welding-type apparatus.

The present invention may also be implemented as a kit to retrofit a welding-type apparatus to trip on an average detected voltage rather than a detected peak voltage or other voltage identifier. Accordingly, the kit includes a circuit board mountable within a housing of the welding-type apparatus. The circuit board includes a microprocessor secured thereto and wired to detect a voltage of a power signal being supplied to the welding-type apparatus by the power source. The microprocessor is further wired to determine an average of the voltage and compare the average to a trip voltage. The microprocessor is further wired to determine if the average of the voltage at least equals the trip voltage and if so, disable the welding-type apparatus.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention is directed to a method and apparatus for overvoltage/undervoltage protection for a welding device such as an arc cutting device. Because welding, heating, and cutting require similar high power outputs, the present invention is equivalently applicable with other high power devices including welding, plasma cutting, and induction heating devices. Further, reference to welding-type power includes welding, cutting, and heating power. Description of an arc-cutting apparatus illustrates one embodiment in which the present invention may be implemented. That is, the present invention is applicable with welding and induction heating systems.

Figure 1:
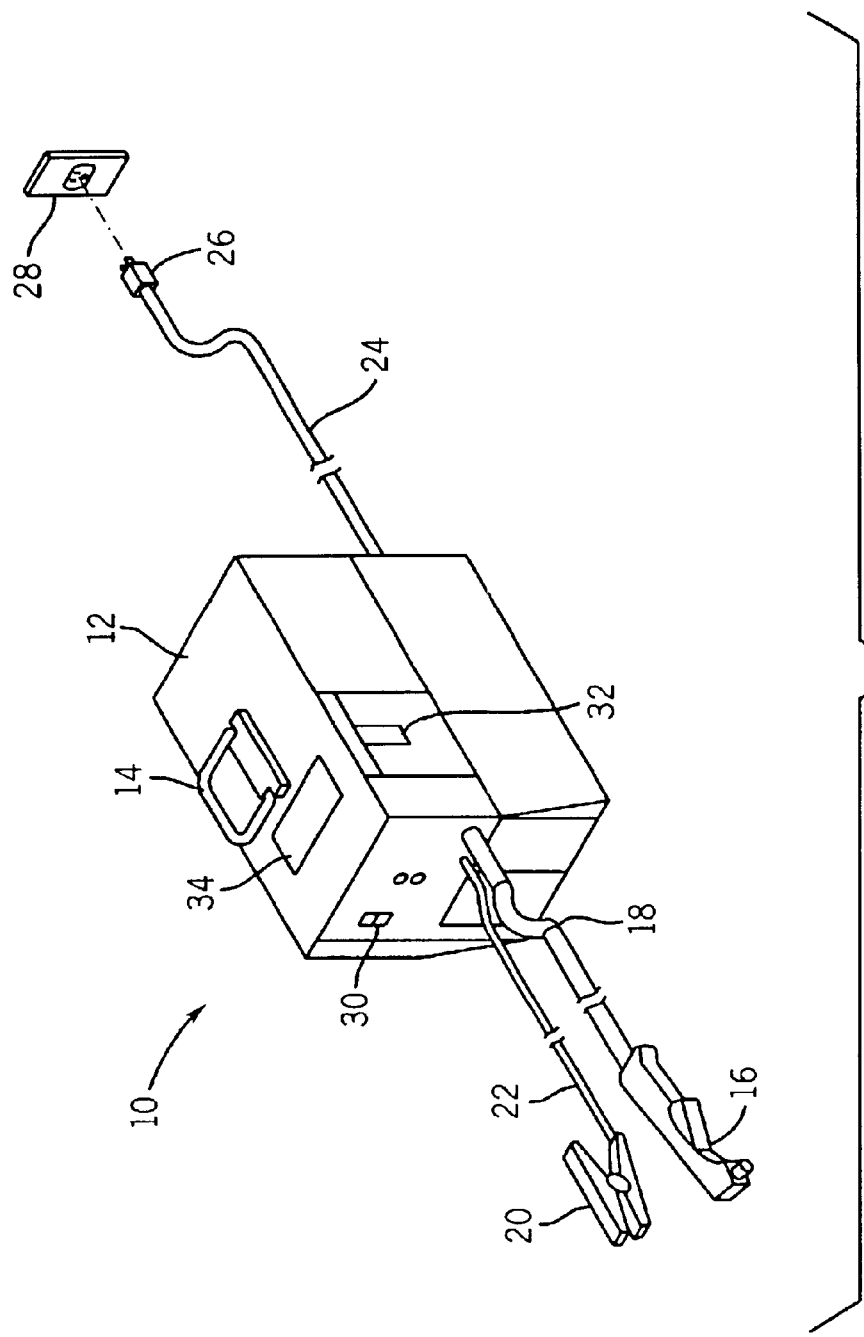
FIG. 1 is a perspective view of a plasma cutter and power source incorporating the present invention.

Referring to FIG. 1, an arc cutting apparatus 10 is applicable with a portable engine driven power source or generator or, alternatively, connected directly to a utility line power source (not shown). The arc cutting apparatus indicates a housing 12 having a handle 14 which effectuates transportation of the arc cutting apparatus from one site to another. Connected to housing 12 is torch 16 via cord 18. Also connected to the power source is a grounding clamp 20 which is designed to ground the workpiece to be cut. Connecting grounding clamp 20 to the housing 12 is cable 22. Extending from a rear portion of housing 12 is power cable 24 having plug 26 for connecting the arc cutting apparatus 10 to a power source such as a generator or a utility line. Depending upon the particular power supply, plug 26 may be inserted into a grounded 120 volt receptacle 28 or a 230/240 volt receptacle. Housing 12 further includes an ON/OFF switch 30, latch 32, and a model label 34.

To effectuate cutting of a workpiece, torch 16 is placed in close proximity to a workpiece (not shown) connected to clamp 20. A user may then raise a trigger lock (not shown) of torch 16 and press a trigger switch (not shown) so that a pilot arc begins. Shortly thereafter, a cutting arc is generated at which the user may then slowly begin moving the torch across the workpiece. The user may then adjust the torch speed based on the amount of pressure applied to the trigger so that sparks go through the workpiece and out the bottom of the cut. Once the cut is complete, it is generally advisable to pause briefly at the end of a cut before releasing the trigger. It is customary for post-flow to continue for a short period of time after release of the trigger. During this post-flow, a cutting arc may be instantly restarted by raising the trigger lock and repressing the trigger switch.

Figure 2:
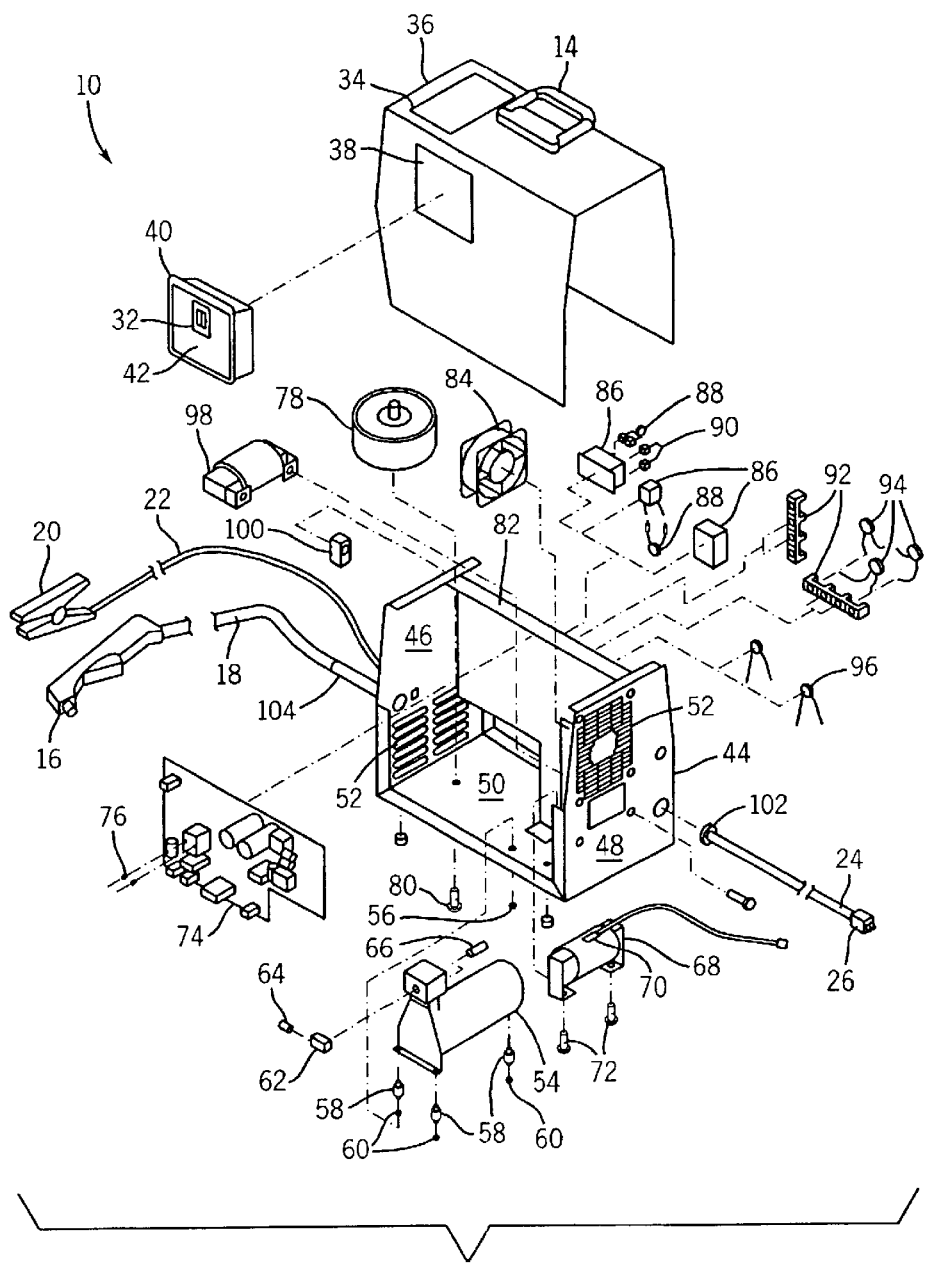
FIG. 2 is an exploded view of that shown in FIG. 1.

Referring now to FIG. 2, an exploded view of the arc cutting apparatus 10 is shown. The housing 12 is defined by an outer frame or cover 36 designed to protect the internal components of the arc cutting apparatus. Attached to cover 36 is carrying handle 14. Preferably, label 34 is affixed to a top portion of cover 36. Cover 36 further includes orifice 38 designed to receive storage box 40 which includes a door 42 for the secure storage of consumables. Storage box 40 further includes latch 32 for locking door 42.

Cover 36 is secured to case section 44 which includes front panel 46, rear panel 48, and floor panel 50. To assist with cooling of the internal components of the arc cutting apparatus, front and rear panels 48 include vents 52. A compressor 54 is also secured within the housing and is mounted to floor panel 50 by nuts 56. Nuts 56 are threaded onto a rubber mount 58 that together with washer 60 securely mount compressor 54 to the floor panel 50 of the power source. Fastened to compressor 54 is elbow 62 and fitting 64 which together securely fasten filter 66 to the compressor. Also secured within the housing 12 is inductor 68 which includes thermostat 70. Inductor 68 is likewise mounted to floor panel 50 of the housing using bolts 72.

The housing also supports and protects a circuit board assembly 74 that controls the internal components and functions of the arc cutter including an overvoltage/undervoltage protection control that will be described with respect to FIG. 3. Attached to circuit board 74 is thermostat 76. A toroid main transformer 78 is also secured within the housing and securely fastened to floor panel 50 using bolt 80. A baffle plate 82 is also provided and generally bisects the internal volume of the housing. The baffle plate 82 operates to separate the various internal components as well as provide structural support for case section 44.

The housing further supports a fan 84 that operates to cool the internal components, relays 86, thermister 88, diode assembly 90, connection studs 92, and varistors 94. A pair of capacitors 96 is also used. The housing further includes a second inductor 98 as well as rocker switch 100. As further shown, a strained relief 102 is connected to back panel 48 for securing power cord 24 to the housing. Extending from front panel 46 is clamp 20 via lead wire 22. Further extending from front panel 46 is torch 16 via cable 18. Securing the connection of cable 18 to the housing is strain relief 104.

Figure 3:
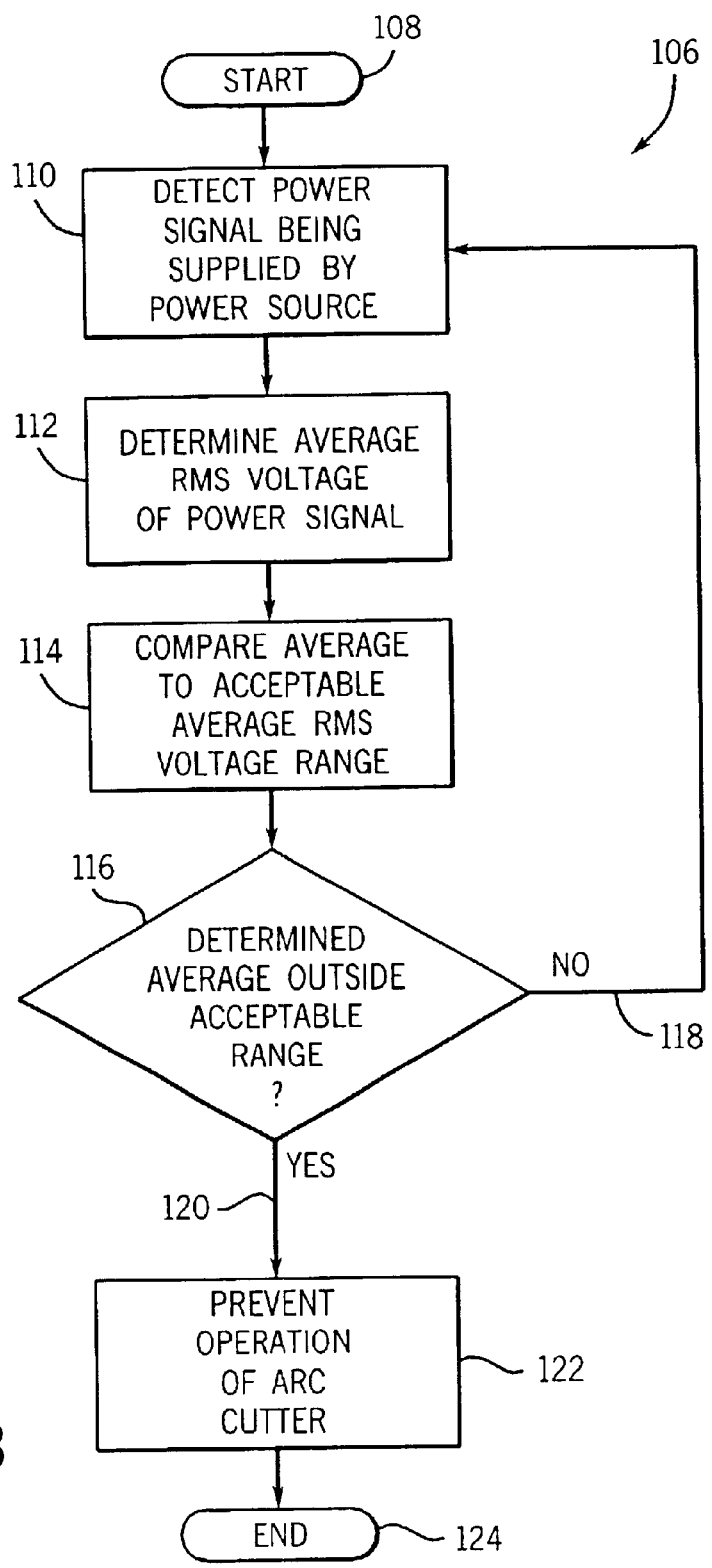
FIG. 3 is a flow chart setting forth the steps of a process for disabling a plasma cutter in accordance with the present invention and that can be used in a software implementation of the invention.

Referring now to FIG. 3, the steps of a process of overvoltage/undervoltage protection for a welding device such as an arc or plasma cutter will be described in greater detail. The process 106 may be incorporated into the welding-type device with software, in which case, the steps are equivalently the acts of a program, or may be equivalently be incorporated in hardware as will be described with reference to FIG. 4, or a combination thereof. Further, software having instructions for carrying out the act of the process may be embodied in a software package or kit to reprogram the voltage protection control of an arc cutting device.

Process 106 begins at 108 with the initial startup of the arc cutting apparatus. Once the arc cutting apparatus is fired up, the process continues with the detection of a power signal being supplied by a power source to the arc cutting apparatus 110. The power signal may be supplied by an engine driven generator, utility line power source, or the like. Once the power signal is detected 110, an average voltage of the power signal is determined at 112. The average voltage is then compared to an acceptable voltage range at 114.

At 116, the process determines whether the average determined at 112 falls outside the acceptable range. If not 116, 118, process 106 loops back to step 110 and continues to detect the power signal being supplied by the power source. If the determined average voltage is outside the acceptable range 116, 120, operation of the arc cutting device is prevented 122. That is, a controller in response to reception of a disabling signal may output a signal to "trip" a switch that disables the arc cutting device. It should be noted that process 106 continues endlessly while the arc cutting apparatus is activated including when the arc cutting device is engaged in a cut. As such, the arc cutting apparatus is continuously monitored to determine if the average voltage of the power signal being supplied falls below or exceeds an acceptable minimum or maximum operating voltage. As a result, process 106 provides both an overvoltage as well as an undervoltage protection. However, it is not necessary that the arc cutting device be implemented with both controls. That is, an overvoltage control in accordance with the present invention may be implemented without implementation of the undervoltage control and vice-versa.

By utilizing an average voltage measurement as opposed to peak voltage measurements for determining whether to "trip" the arc cutting device, the same arc cutting device may be run on a utility power source as well as an engine driven power source such as a generator without undue costs associated with overrated components. For example, an arc cutting device designed to trip on a peak voltage of a 140 volt (RMS) sinusoidal power signal is designed to trip when the peak voltage reaches 198 volts. Operating a similarly designed arc cutting device on an engine driven power source results in "tripping" of the device when the input signal has an RMS voltage of 114 volts. However, designing or configuring the arc cutting device to trip on the average of a 140 volt (RMS) sinusoidal power signal results in "tripping" of the arc cutting device on an average voltage of 126 volts. When powered by a generator, the arc cutting device incorporating the present invention will "trip" at about 146 volts. While the trip voltages for the arc cutting device operating on different power sources are different, the difference between the trip voltages is significantly less when compared to the difference between the trip voltages of a voltage protection control scheme based upon the peak of an input signal. As a result, an end user may operate the arc cutting device on a generator without concerns of the arc cutting device "tripping" at an unusually low voltage when compared to the trip voltage of the same arc cutting device operating on a utility line power source.

Figure 4:
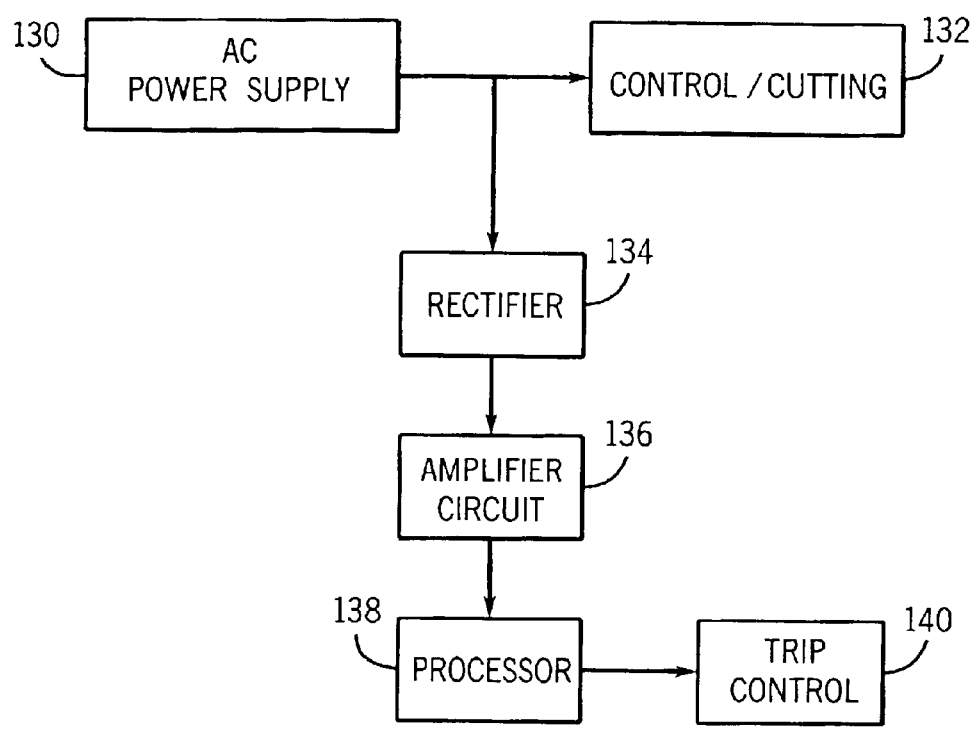
FIG. 4 is a diagram of an electrical circuit designed to disable a plasma cutter based on an average voltage level in accordance with the present invention.

Referring now to FIG. 4, one embodiment of a hardware implementation achieving the advantages of the present invention will be described in greater detail. However, that shown in FIG. 4 represents one of a number of possible schematics that may be used to achieve the aforementioned advantages and equivalents thereof which may be similarly implemented are contemplated and within the scope of the present invention.

As shown, a power supply 130 such as a utility line source or a generator provides power to the arc cutting device 132. Typically, the power supply provides AC power that is used to control operation of the arc cutter. The AC power is also used to effectuate cutting during the cutting process. In accordance with the present invention, the voltage supplied to the arc cutting device 132 is detected and processed as described with respect to FIG. 3. Specifically, the AC signal is input to a rectifier 134 designed to rectify the AC signal and output a rectified DC signal. The DC signal is then input to an amplifier circuit 136 configured to step down the rectified DC voltage. Preferably, the amplifier circuit 136 steps down the DC voltage as set forth in the following equation:

$$DC_{step\text{-}down} = 5 - (V_{dc\_rec}/100) \qquad \text{(Eqn. 1)}$$

The step-down DC voltage output by the amplifier circuit 136 is then input to a processor 138 configured to execute the process described above. Specifically, the processor 138 determines an average of the voltage and determines if the arc cutting device should be disabled based on the average determined. That is, if the determined average exceeds a "trip" value, the processor outputs a trip signal to a trip control 140. Alternately, if the determined average voltage does not exceed a minimum voltage value, the processor would output a signal to prevent pre-mature operation of the arc cutting device.

As described above, the AC power signal is input directly to rectifier 134. Alternately, however, a transformer having a winding designed to supply an output indicative of the line voltage being supplied to the arc cutting device could be implemented. As a result, the need for an amplifier circuit is avoided as the output of the transformer winding is sufficiently low to be used directly by the processor.

Further, the overvoltage/undervoltage control heretofore described may equivalently use a ratio of the overvoltage as the "trip" voltage. That is, rather than using a pure average of the power signal, a tripping of the system could be based on a percentage of the average. For example, the system could be designed to trip at 105% of the pure average. Additionally, a mean voltage or other non-peak voltage measurement could be used.

Therefore, in accordance with one embodiment of the present invention, a voltage protection control is configured to detect a voltage of a power signal being supplied to a welding device by a power source. The control is also configured to determine an average of the voltage and compare the average voltage to a trip voltage. The voltage protection control is further configured to output a disabling signal designed to disable the welding device if the average voltage at least equals the trip voltage.

In accordance with another embodiment of the present invention, a welding-type apparatus operable on either an engine driven power source or a utility line power source is provided. The welding-type apparatus comprises an enclosure housing a plurality of electrical components including a circuit board. The welding-type apparatus further includes a power cable extending from one end of the enclosure and connectable to the power source. A torch as well as a workpiece holder are provided and each is connected via respective connecting cables to another end of the enclosure. The welding-type apparatus further includes a controller configured to determine an average voltage of a power signal supplied to the plurality of electrical components when the power cable is connected to the power source and prevent operation of the welding device if the average voltage is outside an acceptable average voltage range.

In accordance with a further embodiment of the present invention, a method of manufacturing a welding-type device operable on either an engine driven power source or a utility line power source is provided. The method includes the steps of providing an enclosure supportable of a plurality of electrical components. The plurality of electrical components includes a circuit board having at least one processor mounted thereto. The method further includes the step of providing at least one electrical path from the power cable to the plurality of electrical components wherein the power cable and at least one electrical path are configured to translate a power signal from a power source to the plurality of electrical components. The method also includes configuring a processor to determine an average voltage of the power signal and prevent operation of the welding-device if the average voltage is outside an acceptable average voltage range.

In accordance with yet a further embodiment of the present invention, a computer readable storage medium is provided and includes a computer program stored thereon that represents a set of instructions that when executed by a processor causes the processor to detect an average voltage of a power signal translating power to a welding-type apparatus from a power source. The set of instructions further causes the processor to compare the average voltage to an average voltage range and determine if the average voltage falls outside the average voltage range. If the average voltage falls outside the average voltage range, the set of instructions cause the processor to output a signal designed to disable the welding-type apparatus.

The present invention has been described in terms of the preferred embodiment, and it is recognized that equivalents, alternatives, and modifications, aside from those expressly stated, are possible and within the scope of the appending claims.

What is claimed is:

1. A voltage protection control for a welding system configured to:
   (A) detect a voltage of a power signal being supplied to a welding device by a welding-type power source;
   (B) determine a non-peak statistical value of the voltage;
   (C) compare the a non-peak statistical value voltage to a trip voltage; and
   (D) output a disabling signal configured to disable the welding device if the non-peak statistical value at least equals the trip voltage.

2. The voltage protection control of claim 1 further configured to return to (A) if the non-peak statistical value is within an acceptable range.

3. The voltage protection control of claim 1 configured to detect the voltage an output of a rectifier.

4. The voltage protection control of claim 3 wherein the detected voltage is unfiltered.

5. The voltage protection control of claim 1 incorporated into a plasma cutter operable on an engine driven power source and a utility line power source.

6. The voltage protection control of claim 1 wherein the non-peak statistical value is a percentage of an average of the voltage.

7. The voltage protection control of claim 6 wherein the non-peak statistical value is a pure average of the voltage.

8. The voltage protection control of claim 1 wherein the non-peak statistical value is a mean of the voltage.

9. An apparatus operable on either an engine driven power source or a utility line power source, the apparatus comprising:
   an enclosure housing a plurality of electrical components including a circuit board;
   a power cable extending from one end of the enclosure and connectable to a power source;
   a torch and a workpiece holder, each connected via respective connecting cables to another end of the enclosure; and
   a controller configured to determine an average voltage of a power signal supplied to the plurality of electrical components when the power cable is connected to the power source and prevent operation of the apparatus if the average voltage is outside an acceptable average voltage range.

10. The apparatus of claim 9 wherein the controller is further configured to determine if the average voltage at least equals a maximum acceptable average voltage and if so, disable the apparatus.

11. The apparatus of claim 10 wherein the controller is further configured to activate at least one of an audio alert and a visual alert if the average voltage at least equals the maximum acceptable average voltage.

12. The apparatus of claim 9 wherein the controller is further configured to determine if the average voltage is less than a minimum acceptable average voltage and if so, at least one of prevent operation of the apparatus, activate an audio alert, and activate a visual alert.

13. The apparatus of claim 9 wherein the controller is further configured to determine an average voltage of the power signal supplied to the plurality of internal components by the power source and wherein the acceptable range is defined by a maximum acceptable average voltage and a minimum acceptable average voltage.

14. The apparatus of claim 13 configured to trip if the average voltage at least equals the maximum acceptable average voltage independent of peak voltages of the power signal being supplied to the plurality of internal components by the power source.

15. The apparatus of claim 9 wherein the plurality of electrical components includes a rectifier and an amplifier circuit and wherein the controller is further configured to determine the average voltage of the power signal as measured at an output of the amplifier circuit.

16. The apparatus of claim 15 wherein the controller is further configured to determine the average voltage of the power equal before the power signal is filtered.

17. A method of manufacturing a welding-type device operable on either an engine driven power source as a utility line power source, the method comprising the steps of:
   providing an enclosure supportable of a plurality of electrical components, the plurality of electrical components including a circuit board having at least one processor mounted thereto;
   providing at least one electrical path from a power cable to the plurality of electrical components, the power cable and the at least one electrical path configured to translate a power signal from a power source to the plurality of electrical components; and
   configuring a processor to determine an average voltage of the power signal and prevent operation of the welding-type device if the average voltage is outside an acceptable average voltage range.

18. The method of claim 17 wherein the acceptable average voltage range is defined by a minimum operating average voltage and a maximum operating average voltage.

19. The method of claim 18 wherein the maximum operating average voltage includes a trip voltage.

20. A computer readable storage medium having a computer program stored thereon and representing a set of instructions that when executed by a processor causes the processor to:
   detect an average voltage of a power signal translating power to a welding-type apparatus from a power source;
   compare the average voltage to an average voltage range;
   determine if the average voltage falls outside the average voltage range; and if so,
   output a disabling signal designed to disable the welding-type apparatus.

21. The computer readable storage medium of claim 20 wherein the set of instructions further causes the processor to determine if the average voltage exceeds a maximum allowable average voltage and, if so, disable the welding-type apparatus.

22. The computer readable storage medium of claim 20 wherein the set of instructions further causes the processor to determine if the average voltage is below a minimum allowable average voltage and, if so, prevent operation of the welding-type apparatus.

23. The computer readable storage medium of claim 20 incorporated into a software package wherein the set of instructions when executed reprograms an overvoltage/undervoltage protection control of the welding-type apparatus.

24. A kit to retrofit a welding-type apparatus to trip on an average detected voltage, the kit comprising:
   a circuit board mountable within a housing of the welding-type apparatus, the circuit board having a processor secured thereto and wired to:
      detect a voltage of a power signal being supplied to the welding-type apparatus by a power source;
      determine an average of the voltage;
      compare the average to a trip voltage; and
      if the average at least equals the trip voltage, disable the welding-type apparatus.

25. The kit of claim 24 wherein the power source provides a generally sinusoidal power signal to the welding-type apparatus.

26. The kit of claim 25 wherein the power source includes a utility line power source.

27. The kit of claim 24 wherein the power source provides a general triangular power signal.

28. The kit of claim 27 wherein the power source includes an engine driven generator.

* * * * *